April 12, 1960 H. S. BEATTIE ET AL 2,932,451

MATRIX STORAGE ACCUMULATOR SYSTEM

Filed Oct. 31, 1955 9 Sheets-Sheet 1

INVENTORS
HORACE S. BEATTIE
THEODORE L. BULEY
BY
ATTORNEY

INVENTORS
HORACE S. BEATTIE
THEODORE L. BULEY
BY
ATTORNEY

INVENTORS
HORACE S. BEATTIE
BY THEODORE L. BULEY
ATTORNEY

INVENTORS
HORACE S. BEATTIE
BY THEODORE L. BULEY
ATTORNEY

INVENTORS
HORACE S. BEATTIE
BY THEODORE L. BULEY
ATTORNEY

INVENTORS
HORACE S. BEATTIE
BY THEODORE L. BULEY
ATTORNEY

INVENTORS
HORACE S. BEATTIE
THEODORE L. BULEY
BY [signature]
ATTORNEY

April 12, 1960 H. S. BEATTIE ET AL 2,932,451

MATRIX STORAGE ACCUMULATOR SYSTEM

Filed Oct. 31, 1955 9 Sheets-Sheet 8

INVENTORS
HORACE S. BEATTIE
BY THEODORE L. BULEY
[signature]
ATTORNEY

April 12, 1960 H. S. BEATTIE ET AL 2,932,451

MATRIX STORAGE ACCUMULATOR SYSTEM

Filed Oct. 31, 1955 9 Sheets-Sheet 9

INVENTORS
HORACE S. BEATTIE
BY THEODORE L. BULEY

ATTORNEY

United States Patent Office 2,932,451
Patented Apr. 12, 1960

2,932,451

MATRIX STORAGE ACCUMULATOR SYSTEM

Horace S. Beattie and Theodore L. Buley, Poughkeepsie, N.Y., assignors to International Business Machines Corporation, New York, N.Y., a corporation of New York Application October 31, 1955, Serial No. 543,950

9 Claims. (Cl. 235—174)

This invention is concerned with a counter. More specifically, a counter, according to this invention, is an electric type that employs magnetic cores as memory elements in the system.

It is an object of this invention to provide a magnetic core counter that is adaptable for use with various electric accounting and business machines, e.g. an electric typewriter, a key punch, a tape punch, a cardatype, and the like.

Another object of this invention is to provide an electric counter that is sufficiently rapid in operation for reliable use with various available accounting and business machines. Furthermore, the counter, according to this invention, is a versatile one which is able to maintain a running total on a storage matrix, which total may be read out as desired. By making use of modern magnetic cores, the physical size of the structure embodying the system may be very compact and handy.

Briefly, the invention includes a memory type counter system that employs bi-state memory elements. The system includes a storage matrix circuit having a plurality of rows and columns of said memory elements. The system also includes a plurality of summation matrices, each having rows and columns of bi-state memory elements and a temporary storage group of bi-state memory elements. The said system comprises first circuit means for reading out information that is stored in said storage matrix into said temporary storage group and into one of said summation matrices. The system also comprises second circuit means for reading out information from said temporary storage group and from said one summation matrix simultaneously into said other summation matrix. The said first and second circuit means include thereon means for switching said circuits in order to introduce a number to be added algebraically to the number read out of said storage matrix. The system also comprises third circuit means for reading out the information from said other summation matrix to be utilized as desired.

An embodiment of the invention is illustrated in the drawings and described hereafter, in accordance with the applicable statutes. In the drawings:

Figs. 1*a* and 1*b* together constitute a circuit diagram showing the major elements in the whole counter system;

Figure 1A:
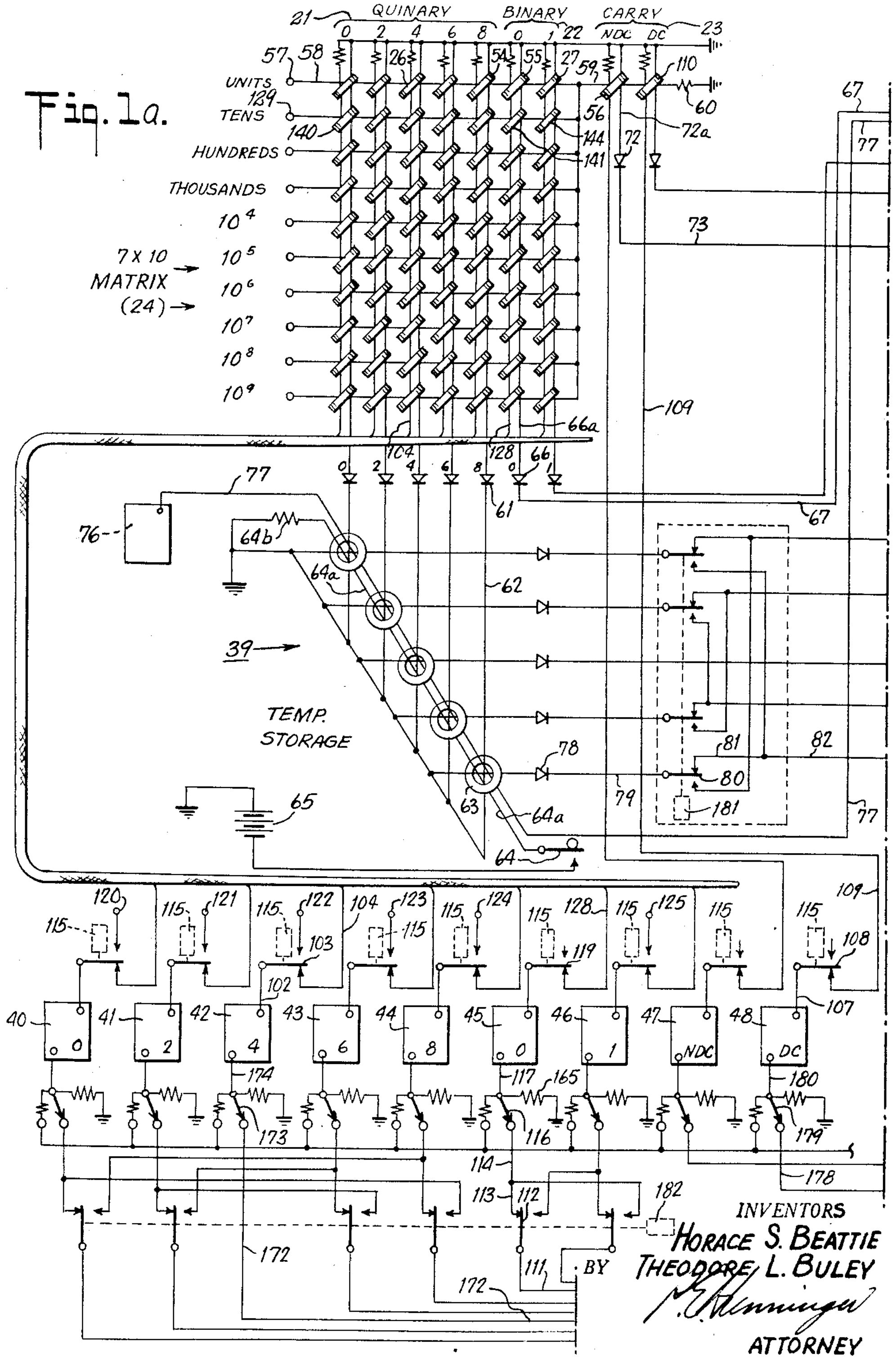

The magnetic core counter according to this invention employs magnetic cores of a type which may be permanently magnetized. Preferably, the core material employed has characteristics such that it has a substantially rectangular hysteresis loop.

The magnetic cores employed are physically quite small. They are in the shape of rings, to form a continuous path of core material without any gaps. The cross-sectional shape of the cores may vary as desired, e.g. it may be round or it may be rectangular.

In the operation of the system, the action of a given core is such that it may be permanently magnetized in one of two states. Such action of a permanently magnetizable core is old and well-known in the art and need not be discussed in detail. One of these two states or conditions of magnetization may be considered a binary 1. When a magnetic field is applied by means of windings on the core, if the direction of the applied field is the same as that of the permanent field, the magnetic state of the core will be unchanged. Furthermore, no appreciable change in flux density will occur, and consequently no output signal will be generated in an output winding. However, when sufficient ampere turns are applied to create a field in the opposite direction, the magnetization of the core material will be switched over to the opposite state with an accompanying large change in the flux density in the core, such that the output winding will have a substantial signal generated therein.

By making use of these characteristics of magnetic cores, binary information may be stored as indicated above, in a manner that is well known. It will be noted that where a single turn winding is employed, a wire is merely passed through the center of a core. Consequently the physical appearance of a matrix of cores will closely resemble the matrices illustrated in Figs. 1*a* and 1*b*. Additional turns for a winding on a common row, or column of cores in a matrix, may be made by threading a wire through the whole row of cores a given number of times, as this will create the given number of turns on all of the cores in the row. No such physical arrangement is illustrated, in order to simplify the showing; but an indication will be made of the number of turns for the various windings. Turns ratios may be varied within practical limits, and of course, the individual number of turns may be varied so that the specific number of turns employed in this description are not to be considered as limiting the invention but merely as being descriptive of a single example.

A counter according to this invention is one which is particularly adaptable for use with an electric typewriter, a keypunch, a tapepunch, a cardatype, and similar serially-operated machines. This counter employs at least one matrix of magnetic cores for storing a given number, and such a matrix may be varied in size to accommodate numbers having any given number of digits.

In using the counter with a typewriter, for example, the typewriter will provide information for entering a number having a given number of digits, onto the storage matrix of the counter. An example of an electric typewriter which may be employed with this invention is one having a translating mechanism like that shown and described in a patent to C. R. Doty, No. 2,278,987, issued April 7, 1942, and assigned to the same assignee as this invention. Thus, the numbers as typed may be translated into a binary form such that various combinations of four separate circuits may be closed to represent the ten Arabic digits, one through nine, and zero. As each such number is entered from the typewriter, or other machine, it will be added to the total which stands already accumulated in the storage matrix so that at any time desired, a total may be obtained from the storage matrix which will automatically clear the matrix, while the total may be fed back to the typewriter to print the number which such total represents. This total may be entered back into the counter or a new series of numbers may again be stored, as previously.

Figure 1B:
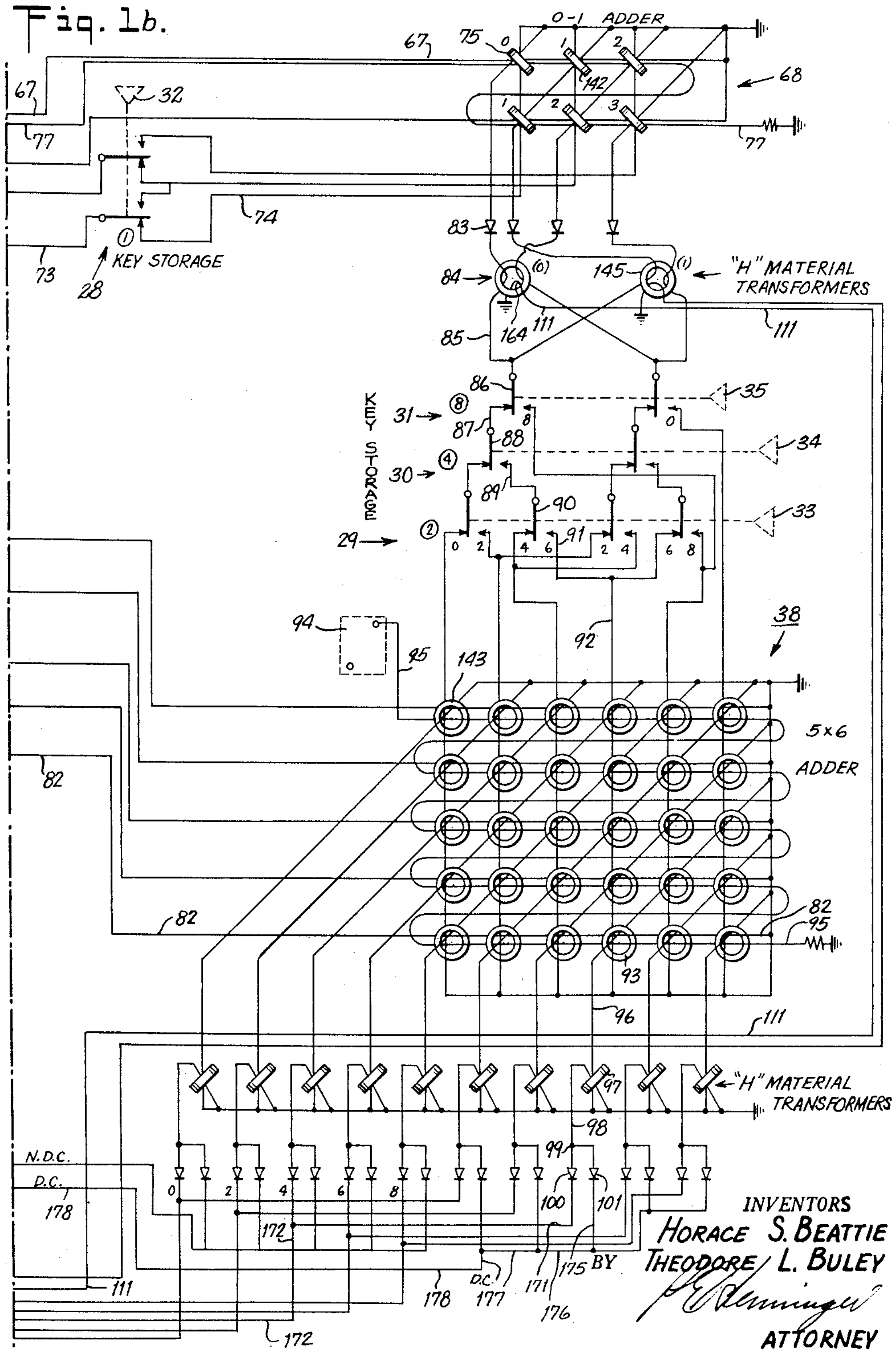

The counter has five major elements, namely: a 7 x 10 storage matrix 24 which may be seen in Fig. 1*a*; a temporary storage set of five cores 39, also shown in Fig. 1*a*; a 0–1 adder 68, composed of a matrix of six cores, which is shown in Fig. 1*b*; a 5 x 6 adder matrix 38 which is shown in Fig. 1*b*; and a key storage device which has mechanical means for actuating four multiple switches that are illustrated in Fig. 1*b* and have the caption "Key Storage."

It will be observed that the storage matrix 24 is composed of seven cores across and ten cores vertically (when viewed as illustrated in Fig. 1*a*) with an additional two cores for the carry operation. The seven horizontal cores are divided into a quinary group 21 and a binary group 22. Also, there is shown with the top row of cores, an additional two cores 23, that are marked "Carry," and that are connected in circuit with all ten rows. It is pointed out that by employing a quinary and binary grouping in this manner a given Arabic digit may be represented by a combination of one of the quinary group plus one or the other of the binary group. Thus, a five digit in the units row is represented by a core 26 in the four (4) column being switched to its binary 1 state, plus a core 27 being switched to a binary state. The core 27 is in the Arabic "one" (1) column of the binary group 22. Consequently the Arabic digit represented in the units row of the 7 x 10 matrix is equal to four plus one, which is five.

The Arabic digits, as stored in the 7 x 10 matrix 24, are those of a given number. By employing a matrix of this size, ten digits may be employed for the number stored. As shown in Fig. 1*a*, the lowest order digit is stored in the top row, and the order of the digits stored, increases in descending order down the ten rows, as indicated. It will be noted that a 9's complement system is employed, in which 9's are entered in the storage matrix after typing out the information stored in the matrix during a total cycle. In order to employ a storage of more than one such number, additional matrices similar to the 7 x 10 matrix 24 may be employed. These additional matrices would be connected in parallel with matrix 24 so that their operation in the system would be identical to that of matrix 24 which will be fully described below.

In entering a number, the key storage device (Figs. 8–13) is actuated to mechanically set up, or store the Arabic digits thereof. The operator will enter the number beginning with the high order digit first, as the number would be typed for example, and ending with the lowest order digit. Such entry actuates the elements of the key storage device in a manner which will be more fully described below. The key storage mechanism is illustrated in Figs. 8 through 13. The number, as thus entered by the operator, is read out of the key storage mechanism in the inverse order, i.e. beginning with the lowest order digit and going to the highest order.

In reading the digits out of the key storage mechanism, there is an emitter switch 25 (Fig. 2) which is rotated from one to the next of its ten contacts in sequence, beginning at the lowest order digit contact and going to the highest order digit contact. During the time that each digit contact of this emitter 25 is closed, a complete cycle of operations is performed in connection with the electrical circuitry, which will be explained in more detail below. Thus each horizontal row of cores in the matrix 24 is connected in sequence to a common circuit via the emitter 25, and a cycle of operations causes the digits as stored in the key storage mechanism to be added to the corresponding digits standing in the 7 x 10 matrix 24.

The entry of each digit is determined by a given combination of key storage switches 28, 29, 30, and 31 (Fig. 1*b*) which will be actuated by the displacement of code pins in the key storage mechanism. These key storage switches are illustrated in Fig. 1*b* and include the four switches marked (1), (2), (4) and (8) that represent a binary coding for the digits as they have been stored in the key storage device. Each of these switches 28 through 31 is actuated by a cam represented by a dashed line triangle 32, 33, 34 and 35, respectively.

It will be noted that the switches 28–31 might be manually actuated in so far as the entry of any single arabic digit into the storage matrix 24 is concerned.

The arabic digit that is being entered is represented by the proper combination of the binary digit representative switches, e.g. entry of a nine is accomplished with the binary first (1) and fourth (8) order switches 28 and 31 actuated, while the switches 29 and 30 remain in the non-actuated positions illustrated.

It is pointed out that a convention is employed in the electric circuits illustrated, to the effect that all solenoid or relay type switches are illustrated in the de-energized position in the drawings herewith.

The arrangement in the key storage mechanism is such that a given set of arabic digits may be entered in succession for the ten order digits (units to $10^9$) to be applied to the counter storage matrix. The highest order position in the storage matrix is used to indicate + or − since this is a 9's complement system. The process of reading out of these digits from the key storage mechanism is controllable so that, should an error be made in the entry of a number, it need not be read out, but may be corrected by removing the incorrect information from the key storage. This is accomplished by rotating one revolution with the circuit de-energized to restore all the code pins. The correct numbers are then entered in the key storage mechanism before reading out into the counter matrices.

So, as an arabic number from the key storage is applied to the storage matrix 24 of the counter, the emitter 25 sweeps down the horizontal rows of cores, beginning at the top or units level, and continuing to the bottom, or ten to the ninth power level of the matrix. As mentioned above, a cycle of operative steps is completed for each arabic digit, during the time that the emitter switch 25 contacts the circuit for that digit. Each such cycle includes the following operations: First, the characteristics of the arabic digits standing in the matrix 24 are read out, including the presence or absence of a decimal carry (which is common to all ten digits). The carry characteristic is modified by the presence or absence of a binary units digit for the corresponding arabic digit of the number to be added (as stored in the key storage mechanism). Together with this carry modification the binary characteristic controls a writing into the 0–1 adder matrix 68 (Fig. 1*b*) by means of two coincident pulses. In the same operation the remaining quinary characteristics of the arabic digit, as standing in the 7 x 10 matrix 24, are read out into a temporary-storage group of cores 39 (Fig. 1*a*). Then, at the proper time, read out from the temporary storage cores 39 is accompanied by a read out of the 0–1 adder cores 68. In this manner the read out of temporary storage cores 39 goes into one dimension of the 5 x 6 adder matrix 38, while the read out of 0–1 adder 68 goes into the other dimension of the 5 x 6 adder 38 simultaneously, as coincident pulses. The read out of the 0–1 adder 68 is modified by the remaining binary digit representation for the arabic digit of the number to be added, as to whether or not it includes any of the binary digits which in code represent two, four, or eight, to thus make up the arabic digit in the key storage. Then the output of the 5 x 6 adder 38 is read to various ones of a series of write thyratrons 40 through 48 (Fig. 1*a*) from which the new information is written back into the 7 x 10 matrix 24, in the form of the sum of the arabic digit as it previously stood in the matrix, plus the arabic digit that was entered by means of the key storage.

*Operation of Figs. 1a and 1b*

The operation of the counter will be made clear by an example in connection with the circuit diagrams, particularly Figs. 1*a* and 1*b*. Such an example is as follows: Consider that a number eight stands in the units row of the 7 x 10 matrix 24. Consequently the magnetic cores in this row will stand switched in the following manner. A core 54, which is in the arabic eight (8) column in the quinary group 21, will be switched. Also a core 55, which is the arabic zero (0) core of the binary group 22, will be switched to represent a 0 standing in this column. Then the total of the switched cores in the binary group 22 and the quinary group 21 is eight, which agrees with the number assumed to be standing in the matrix. In addition, a core 56 of the carry group 23 (representing "no decimal carry") will be switched, since the presence of a number eight in the units row of the matrix 24 does not involve any decimal carry-over situation.

Figure 7:
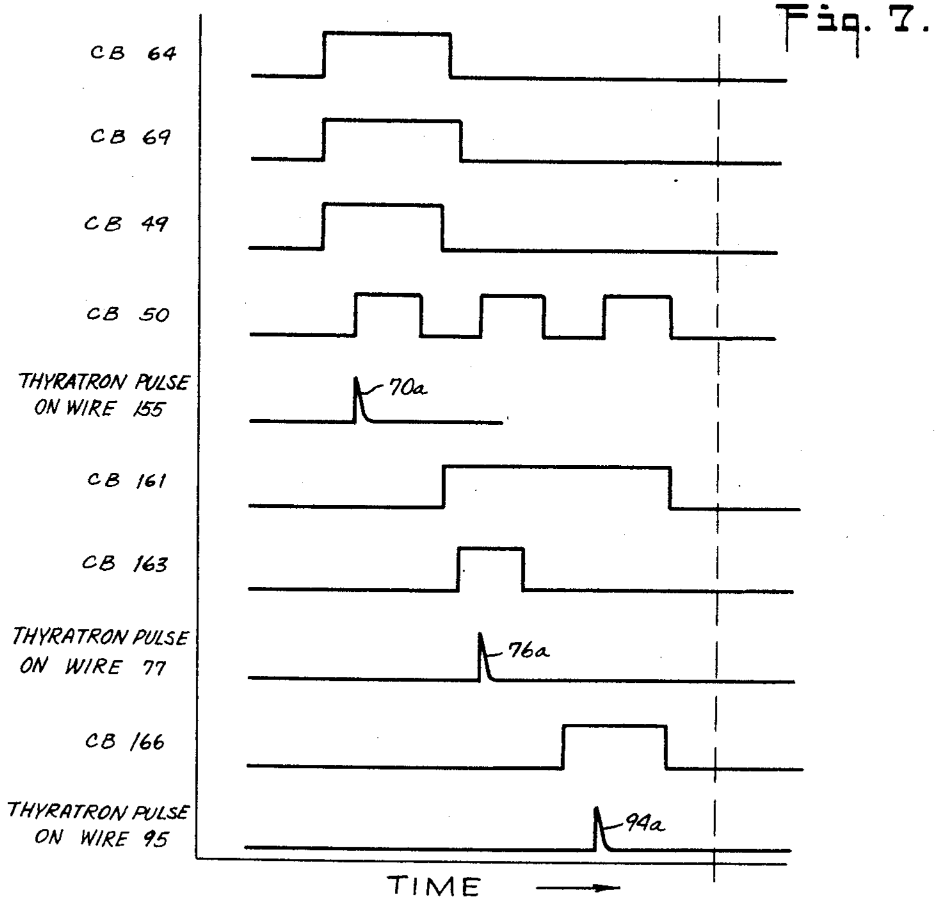
Fig. 7 is a timing diagram for the system showing the relation of the circuit breaker actions to the thyratron pulses for a complete cycle.
Figure 6:
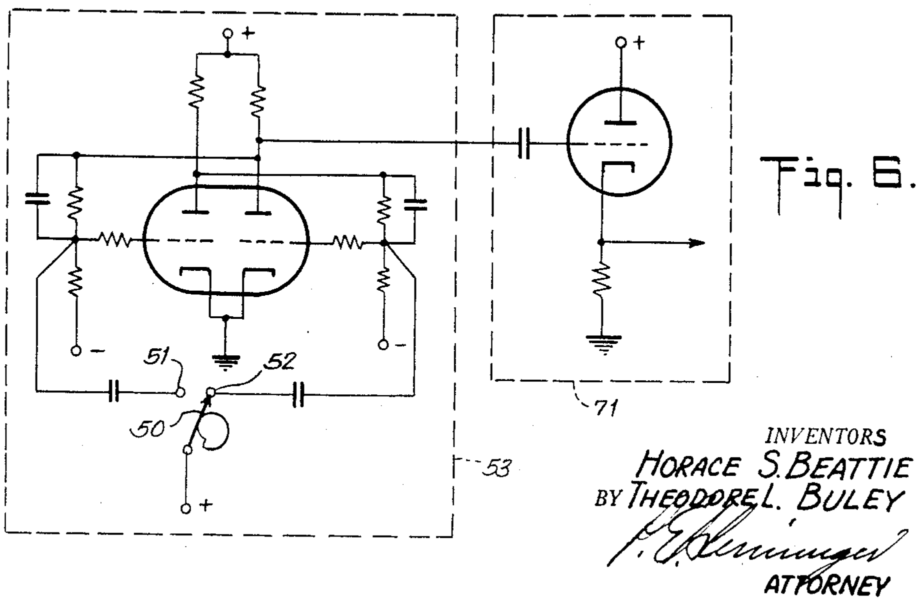
Fig. 6 is a circuit diagram illustrating the details of the trigger circuit employed, and of the cathode follower circuit.

Now assume a number six is to be entered via the operator, employing the key storage mechanism. The operator will have keyed in a six. This will enter during the cycle when the emitter 25 is connected to the units row of cores in the storage matrix 24. This is so, because the key storage starts with the last arabic digit entered and uses this information first. So, as the key storage mechanism number is added there is a cycle of operations for each arabic digit of the number in the key storage, as already indicated above. This example deals largely with one such cycle, and the timing of the various operations for one cycle is indicated in Fig. 7. The reading out of the key storage mechanism may be termed an accumulation operation, to distinguish from a total operation which will be described in greater detail below.

Figure 2:
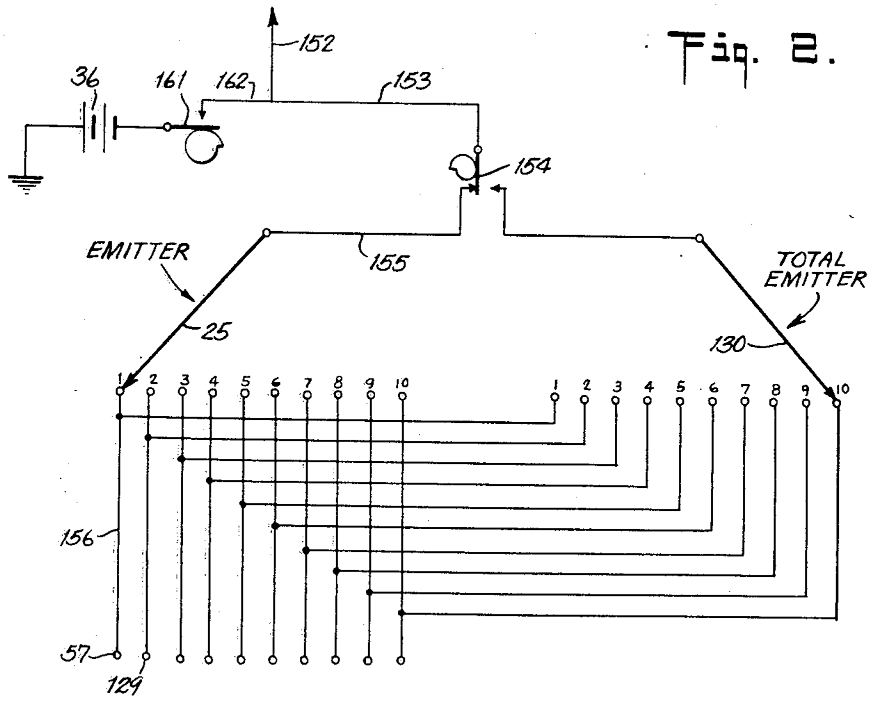
Fig. 2 is a circuit diagram of a portion of the entire counter system including the emitters.

Returning to the present example and including references to the timing diagram of Fig. 7, it is emphasized that the timing diagram shows the relationship of the operations during one cycle. There is one such cycle for each circuit connection by the emitter switch 25 (Fig. 2). This accumulation cycle introduces the arabic digit six by energizing the binary code switches 29 (2 code) and 30 (4 code) (both Fig. 1*b*) and holding them energized throughout the cycle.

The next action in the cycle is the closing of three circuit breakers substantially simultaneously, viz. one, a circuit breaker 64 (Fig. 1*a*) which connects a D.C. bias source such as a battery 65 to a winding **64*a* which threads through all of the cores in the temporary storage groups 39, and is connected to ground via a resistor 64*b*. Two, a circuit breaker 69 (Fig. 3), which sets up a thyratron 70 that will provide a read out pulse via the circuit through the units row of cores in the 7 x 10 matrix 24. Three, a circuit breaker 49 that closes the circuit from the output of the thyratron 70 to the emitter switch 25 which directs the read out pulse over the units row of cores in the storage matrix 24**, as indicated in connection with the second circuit breaker above.

Next, shortly after the closing of the three circuit breakers 64, 69, and 49, when they have had time to make good contact, a circuit breaker 50 shifts its movable contact from a point 51 to a point 52 to throw a trigger circuit 53 over and thus produce a trigger pulse to fire the thyratron 70. This trigger pulse is passed on to the thyratron via a cathode follower 71. This arrangement for firing a thyratron is employed in order to be sure that the thyratron will fire cleanly and quickly with maximum amplitude, since the use of mechanical switch contacts produces much "hash" that would make the action of the thyratron erratic and unreliable. Thus, a read pulse **70*a* (Fig. 7) travels over a wire 58 which threads the top, or units, row of cores in the 7 x 10 matrix 24. The circuit for this pulse may be traced as follows: From thyratron 70, over a wire 151 (Fig. 3) to the now closed contacts of circuit breaker 49. Then over a wire 152 (Figs. 3 and 2) and another wire 153 to a circuit breaker 154 (Fig. 2) that is closed to the left, as illustrated. The circuit continues over a wire 155 to the emitter switch 25, where it continues over a wire 156 to a terminal 57** (Fig. 1*a*). Then from the terminal 57 over the wire 58 and a wire 59 which threads through the two cores in the carry group 23, thence to one end of a resistor 60, the other end of which is connected to ground as shown.

The next action of the cycle takes place at the time of, and is caused by, the pulse **70*a*. As this pulse 70*a* traverses the wire 58 (threading the cores 54, 55 and 56), these three binary 1 state cores 54, 55 and 56 will be switched back to their former (binary 0) state, while producing three output pulses which travel down a vertical column of cores in each case. Thus, output pulse generated by the core 54 will travel via a diode rectifier 61 and a wire 62, through a core 63 of the temporary storage group 39**.

At this time all of the cores in the temporary storage group 39, including core 63, stand previously switched to a binary 0 state. Also, circuit breaker 64 is closed to apply a D.C. bias (from a battery 65) to produce a magnetizing current for all of the cores in the temporary storage group 39 that is half of the amount necessary to switch any one of the cores. Consequently, the output pulse as produced from reading the core 54 will provide a sufficient additional magnetization in the core 63 to switch it to a binary one state. Thus the information which was stored in the quinary group 21 of the 7 x 10 matrix 24 is now stored in the temporary storage group of cores 39.

At the same time the core 55, in the binary group 22, will be likewise switched from its binary 1 state, back to binary 0 state while producing an output pulse. This output pulse will travel over a wire **66*a*, and via a diode 66 and a wire 67** (Figs. 1*a* and 1*b*) which leads through the upper row of cores in the 0–1 adder matrix 68.

Again, from the same read pulse through wires 58 and 59, an output pulse will be likewise generated in the output winding of the core 56. This is the "no decimal carry" core, and a pulse will be generated in the output winding which is constituted by a wire **72*a*. This pulse will travel via a diode 72 and a wire 73** (Figs. 1*a* and 1*b*) which leads to the lower one of the contacts of the switch 28. Then the pulse travels over a wire 74 (since switch 28 is not energized) to the left-hand vertical column of cores in the 0–1 adder 68.

It will be noted that the above three pulses are simultaneously generated by the passage of the read pulse **70*a*, and the latter two are simultaneously applied to a core 75 of the "0–1 adder" matrix 68**. Since each pulse alone will provide one-half the magnetization necessary for switching a core, both together apply the entire amount required. Thus the core 75 will be switched to a binary 1 state.

Following the action thus far described, the four circuit breakers 64, 69, 49 and 50 are returned to their former state as illustrated in the timing diagram of Fig. 7, and a circuit breaker 161 (Fig. 2) is closed to apply a D.C. bias to the storage matrix 24 via the circuit selected by emitter 25. This D.C. bias is obtained from a battery 36 that is connected to ground from one terminal thereof while the other terminal is connected to the circuit breaker 161 which has a contact connected to a wire 162 that joins the circuit to the emitter 25 at the junction between wires 152 and 153. Consequently a D.C. bias is now applied over the wires 58 and 59 (Fig. 1*a*), so that the cores in this units row are prepared to be switched again to a binary 1 state as determined by the sum of the arabic digit which was standing in the row and the corresponding order arabic digit of the number added from the key storage mechanism, as well as in accordance with the decimal carry information.

The next occurrence in the cycle, it will be observed from Fig. 7, is the closing of a circuit breaker 163 (Fig. 3) that sets up a thyratron 76 (Figs. 3 and 1*a*) to be ready to receive a triggering signal for firing the thyratron to produce a read pulse 76*a* (Fig. 7). The triggering signal is the same as before, when thyratron 70 was fired. This is evident from Fig. 3 where it may be observed that the square wave pulse for triggering the thyratrons is obtained from one source for all of the thyratrons, viz. trigger 53 and cathode follower 71. The thyratron 76 (Fig. 1*a*) will be thus triggered to produce read pulse 76*a* that will travel via a wire 77 through all of the temporary-storage cores 39, and in addition it will travel through all of the cores of the 0–1 adder matrix 68 (Fig. 1*b*) to ground. Consequently, any of the cores of the temporary storage group 39, or the 0–1 adder matrix 68, which have been switched to a binary 1 state previously, will be switched back to binary 0 while producing an output pulse therefrom. In other words, core 63 in the temporary storage group 39 will produce an output pulse, and core 75 in the 0–1 adder matrix 68 will produce an output pulse.

These latter two output pulses are simultaneously produced by the same read pulse 76*a* (from thyratron 76), and will travel via separate circuits to each of two dimensions of the 5 x 6 adder matrix 38, in the following manner: First, taking core 63 (temporary storage group 39) and tracing its output or read out pulse circuit, it will be observed that this circuit may be followed from the core 63 via a diode 78, a wire 79, a switch 80, a wire 81, and a wire 82 (Figs. 1*a* and 1*b*) through the bottom row of cores in the 5 x 6 adder matrix 38, and thence directly to ground as illustrated.

Second, taking the output pulse from core 75, it travels simultaneously via a circuit which may be traced beginning at the core 75 and going via a diode 83, and input winding of a transformer 84 and continuing over a wire 85 to a set of contacts 86 of the key storage controlled switch 31, which is in the position illustrated. The circuit continues via a wire 87 to a set of contacts 88 of the switch 30, which will be in the opposite position from that illustrated since the arabic digit as keyed in by the operator is a six (represented by the sum of the second and third order binary digits) which means switch 30 is energized. The circuit then continues over a wire 89 to a set of contacts 90 of the switch 29, which will be likewise in the opposite position from that illustrated. Then the circuit continues via a wire 91 and a wire 92, which threads through the fourth vertical column of cores from the left in the 5 x 6 adder matrix 38. The completion of this circuit is to ground, as clearly illustrated.

Consequently, these two output pulses will be both simultaneously applied to a single core, which is a core 93 in the 5 x 6 adder matrix 38. As pointed out above, the simultaneous occurrence of two output pulses is sufficient to switch a core so that these two pulses will switch this core 93 to a binary 1 state.

At the same time as the output pulse from the core 75 traverses the circuit traced above, another pulse is generated in a secondary winding 164 of the transformer 84 by reason of the passage of the output pulse through the primary winding thereof. This output signal, or pulse, from transformer 84 travels over a circuit to the control grid of thyratron 45 (Fig. 1*a*) which may be traced as follows: Starting at the secondary winding 164 which has one end grounded as illustrated, and going via a wire 111 (Figs 1*b* and 1*a*) to a switch 112 that is in the de-energized position illustrated. Then via a wire 113, another wire 114, a switch 116, and a wire 117 to the control grid of thyratron 45. There is a resistor 165 that has one end grounded and the other end connected to the control grid of thyratron 45. This resistor completes the circuit for the pulse which was just traced. The thyratron 45, when fired, produces a write pulse which travels up the next to last vertical column of cores (from left to right) of the 7 x 10 matrix 24, over the following circuit: From thyratron 45 via a wire 118, a switch 119 (now closed) and a wire 128 which threads through the zero column of cores of the binary group 22 of the matrix 24. Here, the units (horizontal) row of cores is the only one with a D.C. bias applied (emitter 25 is connected to terminal 57 and circuit breaker 49 is open while circuit breaker 161 is closed) and so only the core 55 in the units row, will be switched (to its binary 1 state).

Following the above, and still within the cycle for entry of the arabic units digit ("six") according to the present example, another read pulse 94*a* (Fig. 7) is produced from a thyratron 94 (Fig. 1*b*) which has its grid circuit controlled from the same arrangement as thyratrons 70 and 76. In this instance, the circuit breaker 166 (Fig. 3) is closed first to set up the grid circuit and then the circuit breaker 50 closes to the right as viewed in Fig. 3, for the third time (see CB50—Fig. 7). This produces a square front signal, as explained above, which fires the thyratron 94 producing the read pulse 94*a*. This read pulse will travel via wire 95, which threads through all of the cores of the 5 x 6 adder matrix 38. Consequently the core which has been switched to its binary 1 state, i.e. core 93, will be switched back to a binary 0 state while producing an output pulse via a wire 96. Wire 96 is connected to the primary winding of a transformer 97. Here the pulse is amplified and passed on to two separate circuits via a wire 98 which is connected to a point 99. At point 99 the circuit splits and travels via diodes 100 and 101 to two separate circuits that lead to the thyratrons 42 and 48, respectively.

These two circuits following the split at point 99 in the circuit may be traced in detail as follows: The circuit leading to thyratron 42 goes via the diode 100, over a wire 171, a wire 172 (Fig. 1*b* and 1*a*), to a switch 173, and then over a wire 174 to the input of the thyratron 42. The circuit leading to the thyratron 48 goes via the diode 101, over a wire 175, a wire 176, a wire 177, a wire 178 (Figs. 1*b* and 1*a*), to a switch 179, and then over a wire 180 to the input of the thyratron 48.

It will be noted that at the time that the adder matrix 38 is read, as set forth above, the output pulse therefrom is split and directed to the desired column of the quinary group of cores 21, and to the indicated one of the carry group 23. Also, during this time the D.C. bias remains on the units row of cores and on the carry cores, since the circuit breaker 161 (Fig. 2) remains closed (see Fig. 7).

The two amplified pulses as split from the output of core 93, then cause the thyratrons 42 and 48 to be fired as set forth above, and to produce write pulses which travel back into the 7 x 10 matrix 24 as follows: From the thyratron 42, the circuit for its read pulse goes via a wire 102 and a switch 103, which will be in the position illustrated. Then the circuit continues via a wire 104 to the third column of the 7 x 10 matrix 24. This is the "four" arabic digit column of the matrix. This write pulse, acting in conjunction with the D.C. bias on the units row of cores which is connected to terminal 57, will then cause the core 26 to switch to a binary 1 state. This is the proper core since the sum of eight and six is fourteen, which number has a four in its units digit. At the same time the other circuit may be traced from the thyratron 48, over a wire 107 to switch 108 which is in the position illustrated. Then the circuit continues over a wire 109 to a decimal carry core 110, of the "carry" pair-of-cores 23. Therefore, the core 110 will be switched to a binary 1 state, in like manner as the core 26, due to the write pulse over the latter circuit from thyratron 42, acting in conjunction with the D.C. bias as applied at the terminal 57 of the units row of cores, in the manner pointed out above.

Now it will be observed that with the completion of the operations described above, the first cycle for the entry of the new number is complete, and there is an arabic four in the units row of cores of the 7 x 10 matrix 24. This arabic digit is represented by a zero in the binary group of cores 22, and a four in the quinary group 21. This zero is represented by the core 55 being switched to a binary 1 state, and the four, by the core 26 likewise being so switched. In addition, the decimal carry core 110 has been switched to a binary 1 state. The next cycle of operations is substantially the same except that the emitter 25 has moved to the next contact 129.

The action of the counter circuits during this arabic-tenths-digit cycle, need not be covered in detail in view of the similarity to the action described above in connection with the "units" digit cycle. However, it is pointed out that in the example under consideration, the tens row of cores of the storage matrix 24 has a zero represented therein to begin with (the original arabic number stored was an eight). The zero condition is represented by a core 140 in the quinary group 21 being in its binary 1 state, and another core 141 in the binary group 22 being in its binary 1 state.

Because the key storage mechanism clears each arabic digit after it is accumulated, and as the arabic number entered in this example was a six, all positions of the key storage will now be in the zero state. Hence, none of the switches 28, 29, 30 and 31 will be actuated at the time of the cycle under consideration, but all will remain in the position illustrated in Fig. 1*b*. Therefore, as this cycle progresses, the following action will take place: A zero will be temporarily stored in temporary storage cores 39, and simultaneously a core 142 will be switched in the 0–1 matrix 68. These simultaneous actions are caused by the read pulse **70*a* (Fig. 7). Upon the subsequent readout of these two groups into the 5 x 6 adder matrix 38, as caused by the read pulse 76*a* (Fig. 7), a core 143 will be switched to its binary 1 state. At the same time, an arabic "one" core 144 of the binary group 22** (Fig. 1*a*) will be switched to its binary 1 state. The latter by reason of the output pulse from the core 142 (Fig. 1*b*) passing through a primary winding of transformer 145 which has its secondary winding connected to the input of the thyratron 46 (Fig. 1*a*), the output of which sends a write pulse up the arabic 1 column of the 7 x 10 matrix 24. Then as the cycle is completed, the read pulse **94*a* causes the arabic zero core 140 in the quinary group 21 to be switched back to its binary 1 state, while the no-decimal-carry core 56 is also switched to a binary 1 state because of the split of the output pulse, or read out from the 5 x 6 adder core 143, which sends a pulse to trip the thyratron 47 that writes into core 56 as well as a pulse to trip the thyratron 40 that writes into the core 140**.

The remainder of the cycles in connection with the other arabic order digit rows of the storage matrix 24 are again repetitions of the cycle as shown in Fig. 7. The action in the circuits is the same in principle and need not be mentioned further, except to point out that in the example being considered each of the higher order rows has its arabic digit zero cores set up in both the quinary group 21 and the binary group 22, with a no decimal carry set up in the carry group 23.

As illustrated in the preceding example, the number which stands stored in the 7 x 10 matrix 24 will have a key storage number added thereto each time an entry cycle of operations is carried out. The number to be entered is stored in the key storage mechanism and is added during the course of reading out the previous total number which was standing in the 7 x 10 matrix 24. The addition of the key storage number is accomplished in the entry circuits to the 0 x 1 adder matrix 68 and to the 5 x 6 adder matrix 38, where the individual arabic digits of the number are represented by the position of the key storage switches. Then the total of these two arabic numbers is written back into the 7 x 10 storage matrix 24, a digit at a time, to be stored and to await additional numbers or a totaling procedure to type out the stored total number from the matrix 24.

*Total read out*

In order to take a total reading of the number which stands stored in the 7 x 10 matrix 24, a relay 115 will be energized to switch all of the group of switches that are contained in the output circuits of thyratrons 40 through 48. It will be noted that a convention is employed in the circuits illustrated whereby all relay switches are shown in their de-energized positions. When these switches are in the opposite position from that illustrated in Fig. 1*a*, the output circuits of thyratrons 40 through 44 will be connected to a set of terminals 120 through 124. These terminals are connected to corresponding terminals **120*a* through 124*a* illustrated in Fig. 4, by any convenient circuits (not shown). In like manner, thyratron 46 will be connected to a terminal 125 which is joined to corresponding terminal 125*a*, shown in Fig. 4. Then the actuation of the thyratrons will cause energization of corresponding print magnet solenoids 146** (Fig. 4) in the typewriter, one such magnet being energized for each arabic digit of the number as read out.

Figure 4:
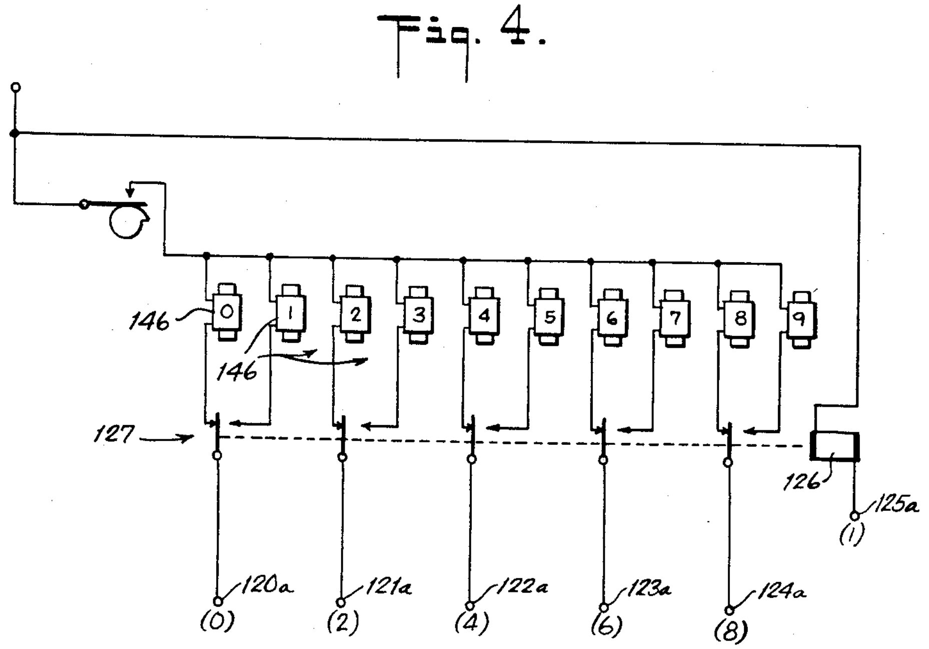
Fig. 4 is a circuit diagram showing the output circuit for printing out a total from the counter.

It will be observed that in order to accomplish the transformation from the quinary-binary grouping to the ten arabic digit solenoids 146, an arrangement according to Fig. 4 is used. This consists in making use of five circuits including the thyratrons 40 through 44 that correspond with arabic digits 0, 2, 4, 6, 8. In addition, there is a relay 126 that will be actuated by the thyratron 46, which is the arabic digit 1 thyratron. In this manner, whenever the number is odd, the digit 1 circuit will be actuated and relay 126 will shift the contacts of its switches 127 so that the circuits for 0, 2, 4, 6 and 8 will be shifted over one place to add a 1 and thus represent 1, 3, 5, 7 or 9.

It will be noted that in totaling, the storage matrix 24 is scanned in reverse by employing a separate totalizing emitter 130 (Fig. 2) which sweeps from the high order to the low. Consequently the number as typed or printed out, will be in the usual order beginning with the high order digit first. A total may be typed out but not removed from the storage matrix 24, by allowing the typing out to actuate the key storage mechanism and then proceed with an operation for entry of a number as described above. Thus the total typed will be re-entered onto the blank storage matrix. Or, by not so actuating the key storage mechanism the storage matrix will be left with 9's in each position for beginning a new series of numbers. Byt this method the total typed out of a storage matrix can also be accumulated into any of the other storage matrices.

*Components*

Figure 3:
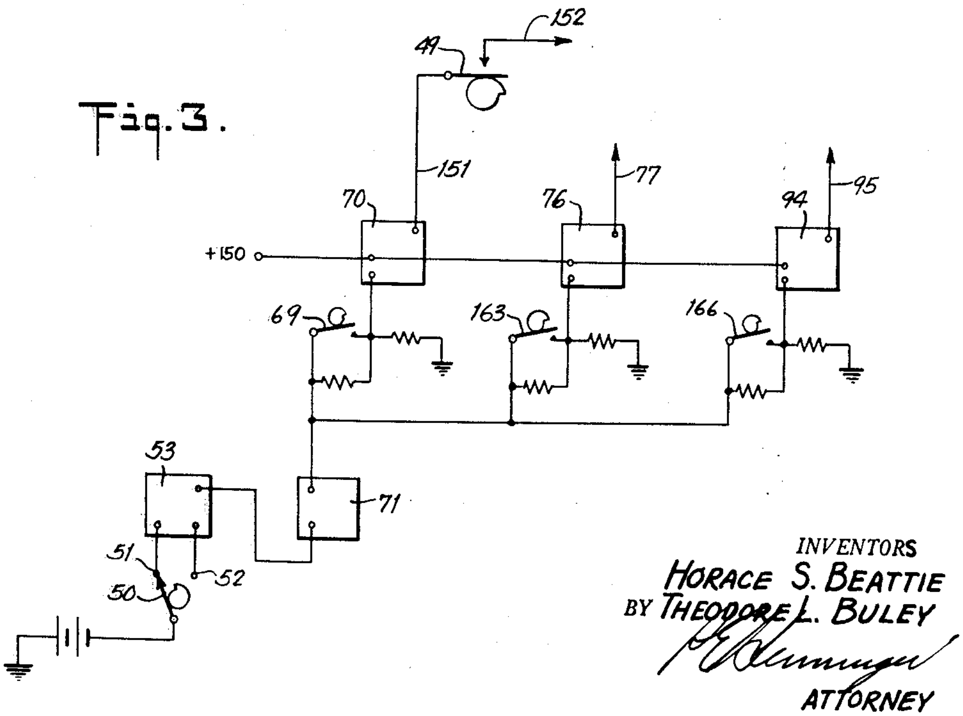
Fig. 3 is a circuit diagram showing the control circuits for the "read" and "write" thyratrons.
Figure 5:
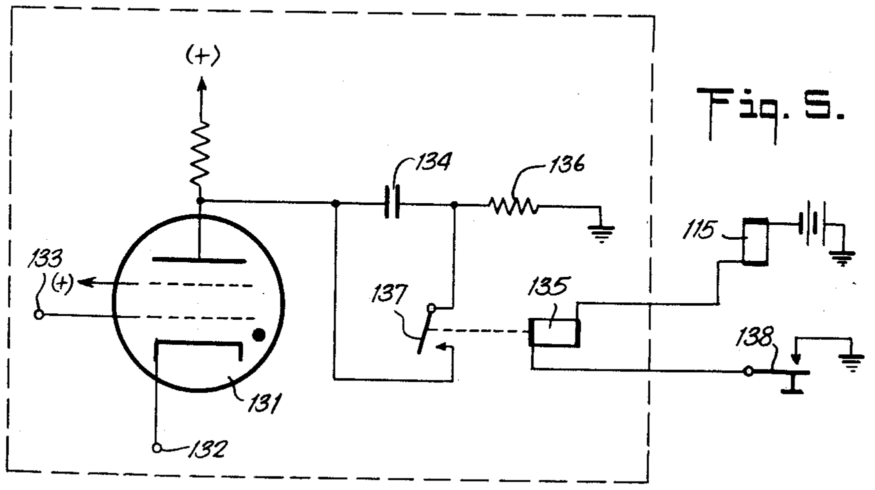
Fig. 5 is a circuit diagram illustrating a typical one of the thyratron circuits.

It will be noted that in Fig. 5 there is illustrated a typical thyratron circuit which may be employed in any of the thyratron boxes 40 through 48 that are illustrated in the Figs. 1*a* and 1*b* circuits, as well as the thyratrons 70, 76, and 94 of Fig. 3. Such a circuit includes a gas filled thyratron tube 131 having a cathode terminal 132 and a control grid terminal 133. In addition, there is a condenser 134, connected to the plate as shown, which may be short circuited or by-passed by employing the illustrated circuit including a relay 135 and a switch 137. The condenser 134 is connected between the plate of thyratron 131 and a resistor 136. Resistor 136 has the other end thereof connected to ground as illustrated.

In the thyratrons as illustrated in Figs. 1*a*, 1*b* and Fig. 3, the terminal in the upper right hand corner of the box corresponds to terminal 132 of the Fig. 5 circuit, which the terminal in the lower left-hand corner corresponds to terminals 133 of the Fig. 5 circuit. Certain of the thyratrons, i.e. those not employed to drive magnet solenoids 146 or relay coil 126, may omit the switch 137 and relay 135, because in these cases the output is always to be in the form of a short duration pulse which is controlled by the capacity of the condenser 134 and other circuit constants. However, in thyratrons 40 through 44 and 46, the short circuiting or by-pass circuit for effectively removing condenser 134 will be included.

In order to energize the relay 135, there is a switch 138 which may be operated by a key or other manual means. Such means may be conveniently located on or near the typewriter as desired. It will be noted that the relay 115 is in circuit with relay 135 so that they will both be energized together. Thus the thyratrons 40–44 and 46 are conditions to provide a change in level signal to actuate the magnet solenoids 146 and relay coil 126 whenever the relay 115 is actuated to give a totalizing operation. In this instance the thyratrons which fired will need to be extinguished, and any conventional arrangement to accomplish this may be employed.

The "zero" and "one" transformers 84 and 145 respectively, are wound on ordinary transformer core material. While various numbers of turns and turns ratios may be employed, it is contemplated that on each of these two transformers 84 and 145, the two primary windings each have ten turns and the secondary winding has one hundred turns. The primamy windings are those which are connected to the read-out or output pulse circuits of the 0–1 adder 68, while the secondary winding is the one which is connected to the control circuit for one of the thyratrons 45 and 46.

The cores in the 7 x 10 storage matrix 24 are each in fact four separate cores with a one turn output winding. The reason for this is to avoid a tendency to switch the other nine cores in a given column of the storage matrix 24. Such tendency to switch would be present and would absorb a great deal of the energy from a switching core, if instead of the four cores, four turns on the output or sensing winding of each were employed. Some arrangement is necessary to gain the required energy for driving the core in the temporary storage group 39, without harmfully tending to switch the other nine cores or groups of cores in the column of matrix 24.

In the specific embodiment of this invention, the number of turns employed for the read windings, write windings, sensing (or output signal) windings, bias windings, etc., are as follows for the different matrices and core groups: The 7 x 10 storage matrix 24 has only three windings for each core, and they are each one turn only. The dual purpose, read pulse, and D.C. bias, windings lead to the emitter circuits and are one turn. The write windings lead from the thyratrons 40 through 46 and are one turn. Also, the output, or sensing windings, which lead to the temporary storage cores 39 and to the 0–1 adder matrix cores 68, are one turn.

The temporary storage cores 39 have two-turn write windings connected to the quinary columns 21 of the storage matrix 24, via rectifier diodes, e.g. diode 61. They have a single turn D.C. bias winding for writing, which is connected to the circuit breaker 64. They have a single turn read winding (wire 77) connected to the thyratron 76. And, they have four-turn sensing (output signal generating) windings connected to write windings of the 5 x 6 adder matrix 38, via diodes, e.g. diode 78.

The 0–1 adder matrix 68 has a two-turn write windings on the vertical circuits, which are connected to the output or sensing windings of the carry group of cores 23. It has a single turn read winding (wire 77) which threads through all six of the cores. It has two-turn write windings on the horizontal circuits, which are connected to the outputs of the binary group 22 of the storage matrix 24. And, it has four-turn output or sensing windings on the diagonal circuits, which are connected to the key storage switches 29, 30, 31 via diodes, e.g. diode 83.

The 5 x 6 adder matrix 38 has a two-turn write windings on the vertical circuits, which are connected to the key storage switches 29, 30, 31. It has two turn write windings on the horizontal circuits which are connected to the outputs of the temporary storage group 39. It has a single turn read winding (wire 95) that threads through all of the cores in the matrix. And, it has five-turn output, or sensing windings, on the diagonal circuits which are connected to the amplifying transformers, e.g. transformer 97.

The diodes employed in the counter circuits should be ones having low forward resistance and capable of passing high current. The purpose of using diodes in the sensing or output winding circuits is merely to prevent loading the write pulse, since the polarity of the sensing winding relative to the write winding is such that such loading would otherwise occur.

In order to avoid back transfer to a core preceding a switching core which is writing into a third core, or otherwise producing an output pulse, the read winding of the switching core is wound through the preceding core in a direction to oppose the back transfer. The back transfer into the storage matrix 24 from the temporary group 39 and the 0–1 adder 68 need not be of any concern, because the effective size of the cores in the matrix 24 is sufficiently larger than those in the other two groups and the turns ratios are one-to-two.

*Subtraction*

It is to be noted that the system may be employed for subtracting arabic numbers as well as for adding the same. In order to effect such an operation, i.e. subtraction, the usual well known procedure may be employed. Thus, by complementing and adding the complement of any given number, a subtraction is accomplished. For carrying out such operations, there are two relays 181 and 182 (Fig. 1*a*). It will be noted that the contacts actuated by relay 181 are effective in causing a reversal of the circuits which lead from the outputs of the temporary storage group of cores 39. Similarly, the relay 182 has its contact so connected that actuation of this rellay will cause a reversal of the connections leading into the thyratrons 40—46. It will be clear that both relays 181 and 182 might be combined into a single relay with sufficient contacts to be connected into the circuits as illustrated. In light of the present state of the art, it will be unnecessary to go into the details involved in carrying out a complement procedure for effecting a subtraction when desired. The relays 181 and 182 are also employed for complementing the information typed out during a total cycle if a negative number is stored in the 7 x 10 matrix.

*Key storage device*

Referring to Figs. 8–13, the mechanical aspects of the key storage device will be described.

Figure 8:
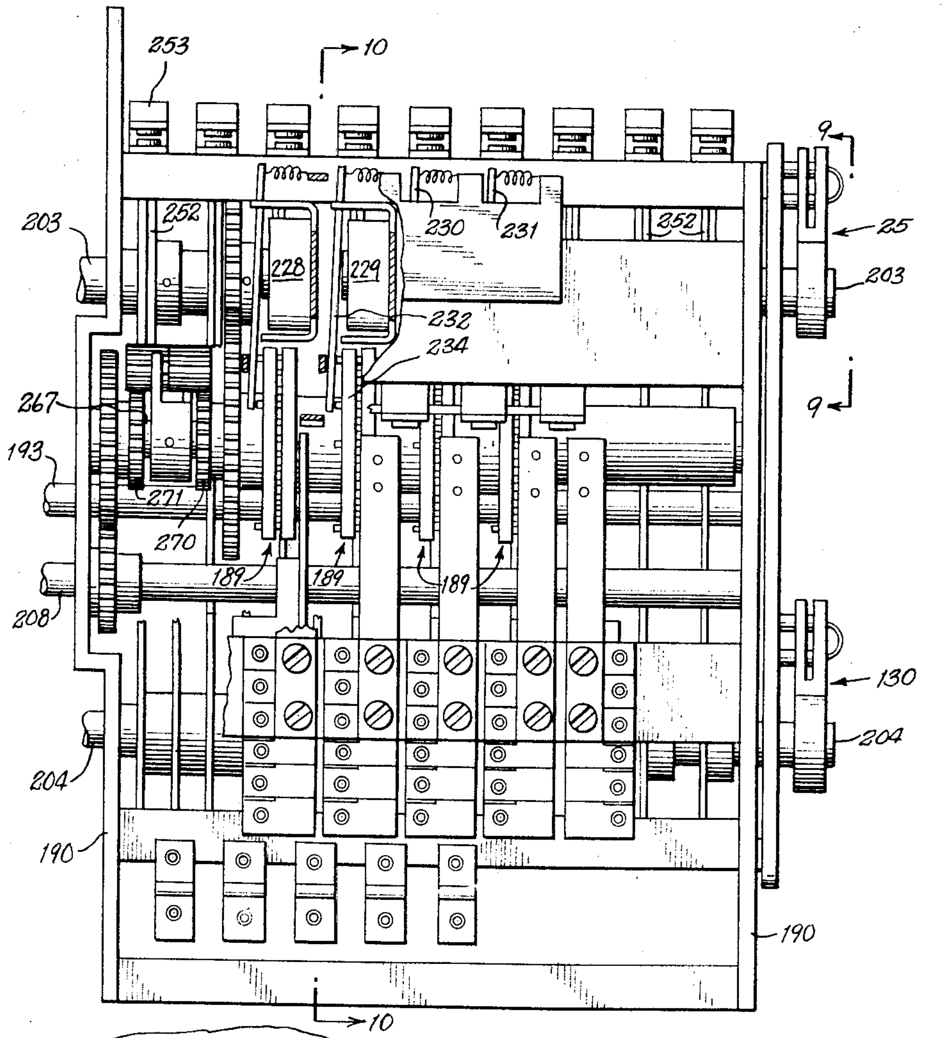
Fig. 8 is a side elevation partly broken away of the key storage mechanism.
Figure 9:
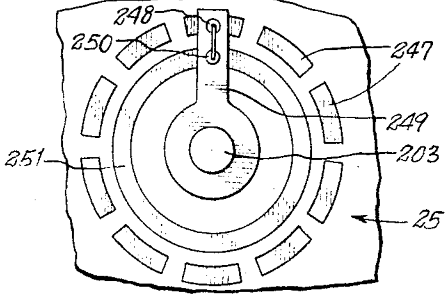
Fig. 9 is a detailed view showing one of the emitters taken along the line 9—9 of Fig. 8.
Figures 12, 13:
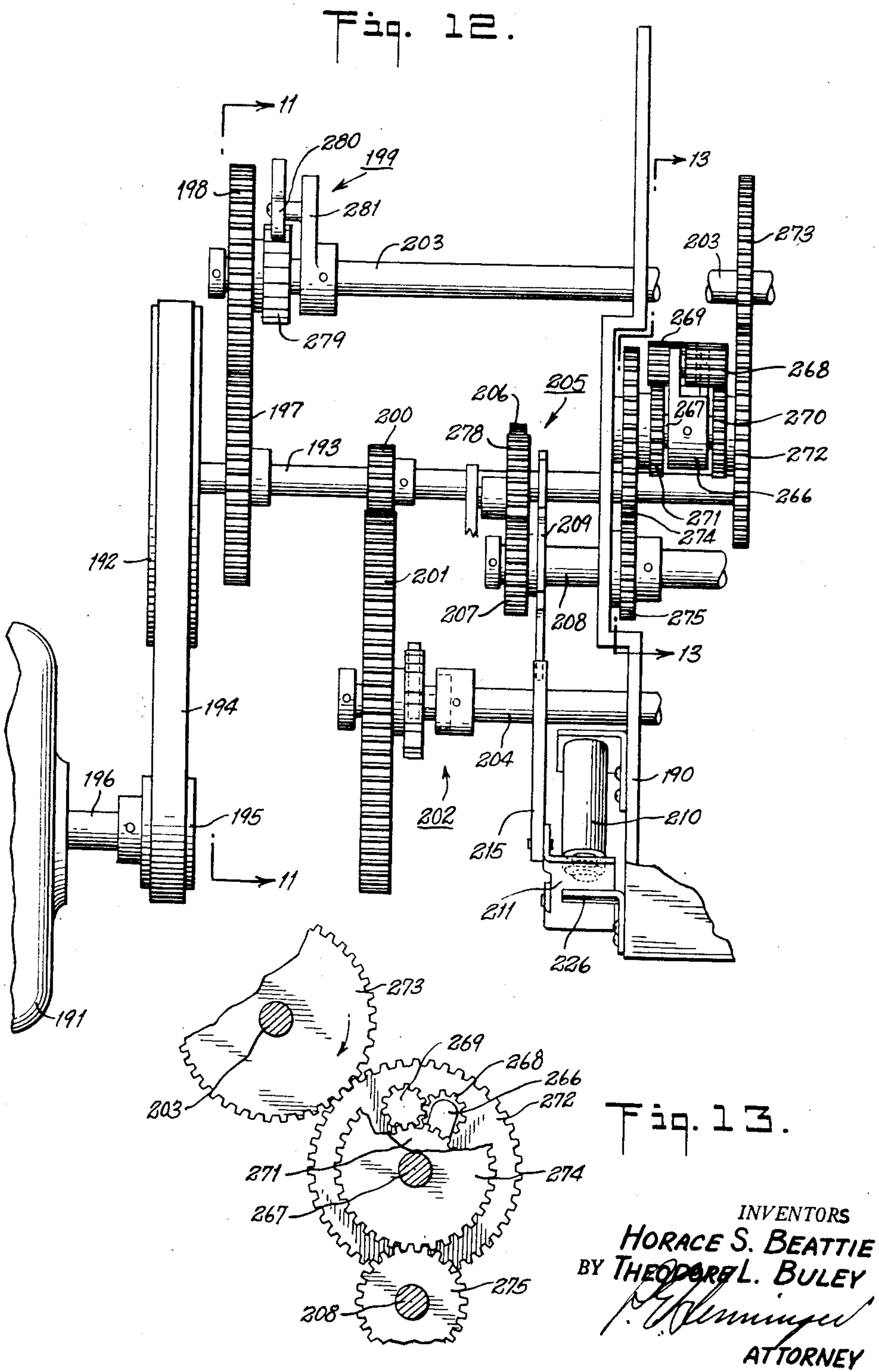
Fig. 12 is a side elevation of the mechanical input to the key storage mechanism including the differential mechanism.
Fig. 13 is an end view of the differential mechanism taken along the line 13—13.

Referring to Fig. 8, it will be noted that the key storage mechanism is supported in a framework 190 that carries a plurality of shafts journaled therein. These shafts are driven both continuously and intermittently, depending upon the control operations, from a primary source of power such as an electric motor 191 (Fig. 12). The motor 191 is connected in driving relation with a pulley 192 that is securely attached to a continuously rotating input shaft 193. The motor 191 may be connected to drive the pulley 192 in any convenient manner such as by means of a belt 194 and pulley 195 attached to a shaft 196 of the motor 191.

Referring to Fig. 12, the continuously rotating input power shaft 193 has a gear 197 securely attached thereto for rotation therewith which meshes with an input gear 198 for supplying power to the input side of a one-revolution clutch 199. The continuously-rotating power shaft 193 also carries a pinion 200 that is securely attached to the shaft 193 for rotation therewith and that meshes with a gear 201, which acts as the continuously rotating input drive gear for another one-revolution clutch 202. Thus, when the one-revolution clutch 199 is energized, a shaft 203 will be rotated one complete revolution and provide an "accumulate" cycle. Similarly, when the clutch 202 is energized the shaft 204 will be rotated one complete revolution, and a "total" cycle will be had. It will be observed that the gear ratios involved are such that an accumulate cycle revolution is at relatively high speed compared to a total cycle.

Prior to each accumulate cycle, if a new number is to be added, the information representing each arabic digit to be added is mechanically stored in the body of the mechanism contained within the frame 190 (see Fig. 8). This operation has been generally described above and will be described in greater detail below. The mechanism may be constructed to provide for a storage of any predetermined number of such digits, and in the mechanism shown, up to ten digits may be thus stored.

During the course of storing these digits a set of four mechanical storage elements 189, in the form of compound discs, are rotated in steps having $1/10$ revolution each. These steps are produced by actuation of a $1/6$ revolution clutch 205 (Fig. 12) that is driven by means of a mechanical clutch driving engagement between the shaft 193, and a gear 206 carried thereon. Consequently the gear 206 is continuously urged for rotation in a given direction depending upon the direction of rotation of drive shaft 193. There is a gear 207 that meshes with the clutch driven gear 206 and that is securely attached to a shaft 208 in any convenient manner, e.g. keyed or splined, in order to cause rotation thereof. Also attached to the shaft 208, by means of being keyed or splined thereto, there is a six-tooth disc 209 (see Figs. 11 and 12).

Figure 11:
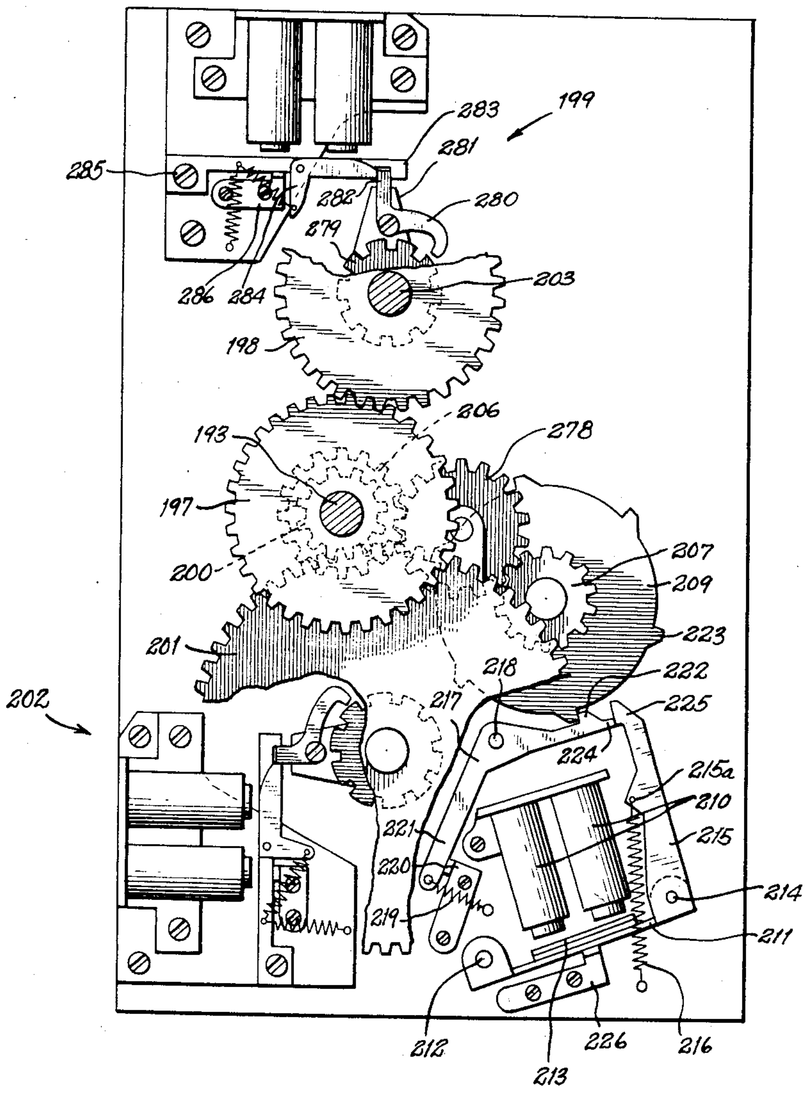
Fig. 11 is an end view with some elements partly broken away showing the driving gears and clutches making up the mechanical input to the key storage mechanism, and taken along the line 11—11 of Fig. 12.

Operation of this $1/6$-revolution clutch 205 will be clear upon referring to Fig. 11 where it will be observed that there is a pair of solenoids 210 which act upon a pivoted arm 211 to cause limited rotation thereof about a pivot shaft 212. The arm 211 carries an armature 213, upon which the solenoids 210 act when energized. Pivoted about a point 214, near the free end of arm 211 (and carried thereby) there is another arm 215 which is situated in a generally up-standing position when viewed as shown in Fig. 11. There is a spring 216 that is connected to the framework (not shown) and to a point 215*a* midway of the length of the arm 215, in a manner as illustrated, so that the force of this spring 216 (which is under tension), tends to pivot both the arm 215 counter-clockwise about the pivot point 214, and also to pivot the arm 211 clockwise about its pivot shaft 212. Thus the arm 215 tends to be pressed against the free end of a detent arm 217. The detent 217 is pivoted about a shaft 218, and is biased for counter-clockwise rotation by a spring 219 attached to the extremity of an arm 221 of the detent. The amount of pivotal movement is limited by a stop 220 which contacts the arm 221 of the detent 217. At the effective end of the detent 217 there is a tooth 222 which normally rests in the path of the six teeth 223 on the disc 209. It will be observed that the teeth 223 are constructed with their radial faces on the side for engaging the transverse face of the tooth 222. Extending beyond the tooth 222 at the effective end of the detent 217, there is a finger 223 that is contacted by the flat face of a tooth 225 located at the end of the pivoted arm 215. The tooth 225 and finger 224 are so proportioned that when the solenoids 210 are energized and the arm 211 is pivoted about pivot 212, tooth 225 will engage the finger 224 in overlapping relation therewith by the pivoting of arm 215 about its pivot 214. Then upon de-energization of the solenoids 210, the spring 216 will overpower the spring 219 and pull the arm 211 down against a stop 226 and so release the disc 209 for rotation.

It is pointed out that the extremity of arm 215 (at the opposite end from pivot 214) extends sufficiently above the highest portion of the tooth 222 on detent 217 so that after the de-energization of the solenoids 210, the tooth 223 of the disc 209 as it rotates, will contact this extremity of the arm 215 and knock it off the finger 224 at the end of the latch 217 in passing.

*Operation of clutch 205*

When the solenoids 210 are energized, arm 211 will be pivoted about its shaft 212, raising arm 215 until its extremity may pivot about 214 and engage the finger extension 224 of the detent 217. At this point nothing further will take place so long as the solenoids 210 are energized, because the tooth 222 still is in engagement with one of the teeth 223 of the disc 219. However, as soon as the solenoids 210 are de-energized, the spring 216 will cause the arm 211 to pivot about the shaft 212 in a clockwise direction. Consequently, with the tooth 225 of the arm 215 hooked over the finger 224 of the detent 217, the detent 217 will be caused to pivot about its shaft 218 until one of the teeth 223 has been released, thus allowing the disc 209 to rotate. Then, as the tooth 223 is released, it rotates beyond the tooth 222 on the detent 217 and comes in contact with the extremity of the tooth 225 of the arm 215 and knocks off the hooked engagement between the tooth 225 of arm 215 and the finger 224 of the detent 217. Consequently the detent 217 may pivot back into the path of the next tooth 223 under the urging of its spring 219, and arrest the rotation of the disc 209 after one-sixth revolution thereof. This one-sixth revolution will be translated into one-tenth revolution within the key storage mechanism by appropriate gearing.

Each time the operator of the typewriter or other serially-operated machine actuates a key representing a given arabic digit (as explained above), the set of code bars on the machine will actuate four switches in a particular coded combination as described above. The code employed is a binary code, so that in order to represent any of the arabic digits 1–9 there need be only four circuits. These four circuits each control the actuation of one of four solenoids 228, 229, 230 and 231 (Fig. 8). As shown in Fig. 8, each of these four solenoids actuates a spring-biased arm, or bail, e.g. an arm 232 supported in hinged relation in connection with each solenoid 229 through 231. Since all four of the solenoids and related parts are identical and operate in the same manner, only one need be described in detail.

Figure 10:
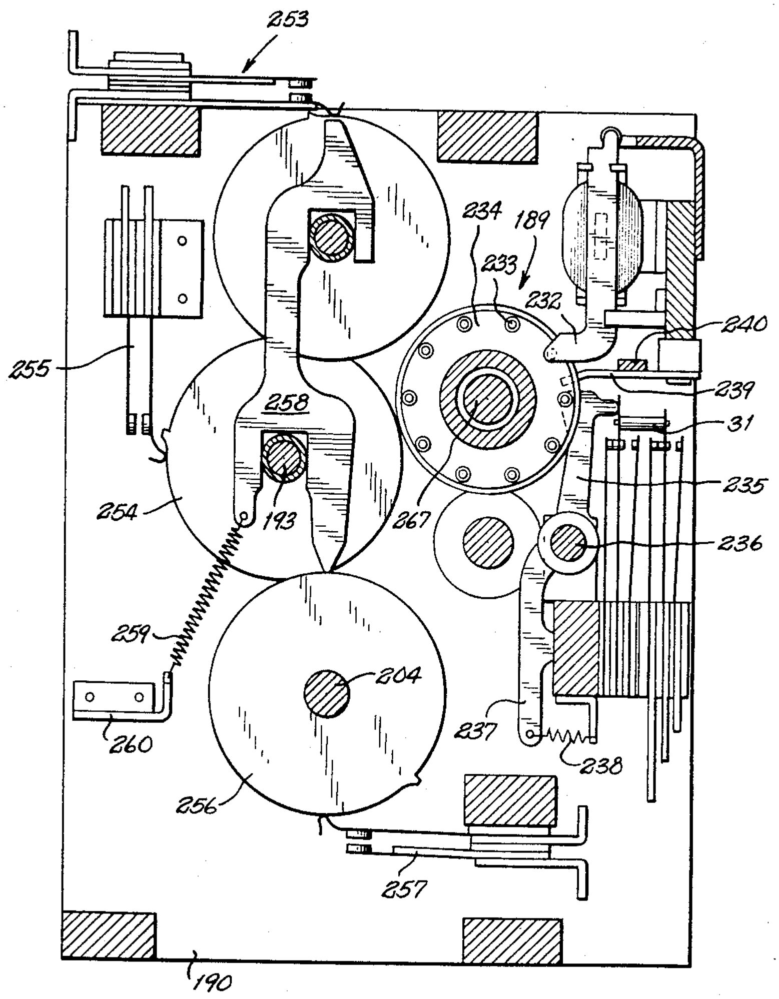
Fig. 10 is a cross-section view taken along the line 10—10 of Fig. 8.

Referring to Fig. 10 it will be observed that the arm 232 has a pointed extremity that is bent left (when viewed as shown in Fig. 10) and extends over the ends of a set of ten slidable pins 233. These pins 233 are carried near the periphery of a disc 234. The disc 234 is so constructed that each of the pins 233 is biased to either of two different positions, one of which is with one end of the pin extending on the side that the arm 232 is located with the other end flush with the surface of the disc (see Fig. 8). The other position of the pins is with one end thereof extending out from the surface of the disc 234 into the path of a spring-biased follower arm 235. Each follower arm 235 is part of a circuit breaker, or switch, which is one of the four key storage switches 28, 29, 30 or 31. It will be noted that the follower arms 235 are pivoted about a shaft 236, and each has another arm 237 integral therewith extending in the opposite direction beyond the pivot shaft 236. This arm 237 carries a spring 238 at the extremity thereof for biasing the follower arm 235 into the path of the pins 233 (see the position illustrated in Fig. 10).

It will be noted that as the disc 234 is rotated counter-clockwise (as viewed in Fig. 10), whenever one of the pins 233 stands positioned in its right hand position (as viewed in Fig. 8), the follower arm 235 will be caused to pivot about its shaft 236 against the spring bias of spring 238, and transfer the switch contacts to their opposite position from that illustrated in Fig. 10.

The key storage mechanism as so far described may be best understood by describing the operation in connection with the keying-in of a given set of arabic digits by an operator. Such operation is as follows: When the operator depresses a key for a given arabic digit, the circuit for given ones of the four solenoids 228, 229, 230 and 231 will be closed, at the same time as the circuit for solenoids 210 of the one-sixth revolution clutch is closed. This will cause the arms 232 of the corresponding solenoids 228–231 to be pivoted and thus push the corresponding pins 233 which stand thereunder, to their other position through the disc 234.

At the same time, energization of the solenoids 210 will cause a latch of the arm 215 over the end of the detent 217 so that the tooth 225 hooks over the finger 224. Then the parts remain in this position so long as solenoids 210 are energized.

Then, upon release of the circuits when the operator releases his key, solenoids 210 will be deenergized and allow the spring 216 to pivot arm 211 about its pivot 212. This will pull down the arm 215 so as to release tooth 222 from the engaged one of the teeth 223 of the clutch disc 209. This will allow a rotation of disc 209 which in turn will rotate the discs 234 one-tenth revolution in a clockwise direction as viewed in Fig. 10.

The above operation may be repeated for ten successive arabic digits, and depending upon which digit is entered, the proper ones of the pins 233 will be positioned each time in order to correctly represent the digit that was entered in each case.

Next, an accumulate operation will be effected which will actuate the one revolution clutch 199 and cause the storage discs 234 to be rotated in the opposite direction, i.e. counter-clockwise as viewed in Fig. 10 for a single complete revolution. This will be accomplished by means of a differential gearing arrangement that will be described in more detail below, and as the discs 234 are thus rotated in the opposite direction from the keying in storage operation, a series of accumulate cycles will be effected in the matrix circuits (Figs. 1*a* and 1*b*) as the pins 233 travel into the path of the follower arms 235 and cause operation of given ones of the key storage switches 28–31 for each cycle.

It will be noted that whenever a series of accumulate cycles is commenced, it will be the last digit entered by the operator that will control the key storage switches for the first accumulate cycle that is read. Then, as the rotation producing the accumulate cycles continues, succeeding pins 233 will rotate into the path of, and cause operation of, the given ones of the key storage switches, successively for each of the remaining accumulate cycles.

It is pointed out that during an accumulate operation, all of the pins 233 which were set over in connection with the keying-in operation, will be returned. This takes place by means of a bail or arm 239 which has a stop 240 on one side thereof. The bail 239 acts to push any pin 233 back through the disc 234 to its original position (out of the path of the corresponding follower arm 235). Thus, the key storage pins 233 which have been set up by the operator as the arabic digits were keyed into the mechanism, are all wiped out automatically as the digits are accumulated into the storage cores of the counter matrix 24.

It will be noted that the emitter switch 25 is rotated by the shaft 203 so that it also makes a complete revolution during the accumulate cycles, as determined by the operation of one-revolution clutch 199. In this manner the emitter switch will close the ten circuits in succession to complete an accumulate operation including the ten cycles as has been clearly described above in connection with the electrical circuits.

It is pointed out that there are ten conducting sectors 247 (Fig. 9) which are contacted by a brush 248 carried by an arm 249 of the structure of emitter switch 25. The common circuit for the arm 249 is carried by a sliding contactor or brush 250 which makes electrical contact with a slip ring 251. The accumulate cycles always begin with a given one of the conducting sectors 247 and make a complete sweep covering all ten of the sectors, since this action is created by the one-revolution clutch 199 which causes the shaft 203 to be rotated one full revolution.

In connection with an accumulate operation, or group of cycles, there is a series of cam discs 252, all securely attached to the shaft 203 for revolution therewith. Each of these cam discs 252 actuates a circuit breaker 253; in addition, there are cams 254 carried by the shaft 193 which is continuously rotating, and these cams actuate additional circuit breakers, such as a circuit breaker 255 illustrated in Fig. 10. Also, there are similar cams 256 that are carried by the shaft 204 which is rotated when a total cycle is carried out. These cams 256 actuate circuit breakers such as circuit breaker 257 shown in Fig. 10 and in addition the same cams 256 act upon the circuit breakers 253 by means of flat double-forked extension arms 258 which act as followers on the cams 256 and produce actuation of the circuit breakers 253 by remote action, as clearly illustrated in Fig. 10.

It will be noted that there is a spring 259 connected to a lug 260 that it attached to the framework 190 and also attached to an extension of each of the follower arms 258. This spring maintains the follower arms 258 in contacting relation with the surface of the cams 256.

The differential mechanism which drives a shaft 267 that carries the four key storage discs 234 is driven from either of two inputs. One of these inputs is the output of the one-sixth revolution clutch 205 that is transmitted via the shaft 208, while the other input to the differential is the output of one-revolution clutch 199, which rotates the shaft 203.

Referring to Fig. 12 it will be noted that the output of the differential is the shaft for rotating the key storage discs 234 as indicated above, and rotation of this output shaft 267 is caused by the rotation of a yoke 266 which is pinned to, or otherwise securely fastened for rotation with, the shaft 267 which carries the key storage disc 234, as indicated above.

Details of the differential are illustrated in Figs. 8 and 13. The yoke 266 carries two meshing planetary gears 268 and 269 which, in addition to meshing with the other, meshes with gears 270 and 271 respectively. The gear 270 is integrally attached to a larger gear 272 for rotation therewith, and gear 272 meshes with a gear 273 that is securely attached to the shaft 203 for rotation therewith. Thus one input is introduced from the shaft 203. For the other input of the differential, a train of gears may be followed which includes the gear 271. Gear 271 meshes with the planetary gear 269 which is rotatably carried by one fork of the yoke 266. The gear 271 is securely attached to (as being integral therewith) a gear 274, that meshes with a gear 275. Gear 275 is securely attached to the shaft 208 for rotation therewith. Thus the other input is introduced from the shaft 208.

It is pointed out that each of the compound gears 271—274, and 272—270, is carried on the shaft 267; but each is freely rotatable thereon.

The operation of this differential unit will clarify its construction, and may best be described in connection with Fig. 13 and Fig. 12. It is pointed out that this differential acts to rotate the shaft 267 in one direction or the other, depending upon which input is rotated. In other words, the operation of this entire key storage mechanism in connection with the counter, is such that either the shaft 203 is rotated or the shaft 208 is rotated, but not both at the same time.

To follow the action through as one input is rotated with the other held stationary, when the shaft 203 is rotated clockwise as viewed in Figs. 10, 11 and 13, the gear 273 will be rotated clockwise therewith, for one full revolution as determined by the output of one-revolution clutch 199. This will rotate the gear 272 counter-clockwise, which in turn will carry gear 270 (Fig. 8), also counter-clockwise therewith. Gear 270 meshes with the planetary gear 268 and consequently gear 268 will be rotated clockwise. Then, gear 268 meshes with the other planetary gear 269 so that this planetary gear 269 will be rotated counterclockwise. When the planetary gear 269 is rotated counter-clockwise, it will walk around on the gear 271 (now held stationary) and carry the yoke 266, upon which it is pivoted therewith. Thus, counter-clockwise rotation of the yoke 266 and the shaft 267 (to which the yoke is pinned) will be had. To trace the operation of the differential under input rotation from the shaft 208, and referring to Fig. 13 and Fig. 12, it will be noted that the shaft 208 will be rotated counter-clockwise when viewed as shown in Figs. 10 and 13, and consequently the gear 275 is likewise rotated counter-clockwise. Therefore, gear 274, which meshes with gear 275, will be rotated clockwise and consequently the gear 271 will likewise be rotated clockwise. This will cause the planetary gear 269, which meshes with gear 271, to be rotated counter-clockwise and consequently the other planetary gear 268, which meshes therewith, will be rotated clockwise. Now, since the gear 270 is being held stationary, clockwise rotation of the planetary gear 268 will cause the yoke 266 to be rotated as the gear 268 walks around in a clockwise rotation, carrying the shaft 267 therewith in a clockwise direction.

The gear ratios involved are so designed that clockwise rotation of the shaft 267 will be in one-tenth revolution steps corresponding to the one-sixth revolution made by shaft 208 each time the one-sixth revolution clutch 205 is actuated. Thus, it will be observed that during the ten cycles of accumulation, the rotation of shaft 203 (output of one-revolution clutch 199) will cause the rotation of shaft 267 and key storage discs 234 for one complete revolution in a counter-clockwise direction. Consequently the various pins 233 which have been positioned into the path of the corresponding follower arms 235 will cause actuation of the circuit breakers, e.g. 31 (Fig. 10), which have been termed "key storage switches" in the circuit description above. On the other hand, the differential will cause opposite rotation of the shaft 267 during the keying-in operation by the operator, which operation is effective to cause rotation of the shaft 208 by increments of one-sixth revolution while the shaft 203 is being held stationary.

It is to be noted that in order to obtain the desired direction of rotation of the differential output, when the keying in operation is being effectuated, the constantly rotating input to the one-sixth revolution clutch 205 is such as to bias the shaft 208 for counter-clockwise rotation. This is accomplished by employing an idler gear 278 (Fig. 11) which meshes with gears 206 and 207 to cause these two (206 and 207) to rotate in the same direction. It will be remembered that the constantly rotating input drive is such as to rotate shaft 193 and consequently gear 206 counter-clockwise as viewed in Figs. 10, 11 and 13.

It will be clear that a totaling operation as described above in connection with the electrical circuit, will be commenced by actuation of the one-revolution clutch 202 (Fig. 11 and Fig. 12). This will cause the total emitter 130 to be rotated a complete revolution. Electrically speaking, this is in the opposite direction from the accumulate emitter 25. Of course the mechanical rotation is in the same direction for both emitters although total emitter 130 rotates at a much slower rate. The electric circuit connections are such that the sweep of the ten horizontal circuits representing arabic digit orders is effected in reverse order as indicated above. It will be noted that the contacts 248 and 250 are electrically connected but insulated from the emitter arm 249.

The total emitter 130 may be seen in its structural form in Fig. 8 where it is identical in structurre to the emitter 25 except that it is attached to the shaft 204 which is rotated at a reduced speed compared to the rotation of accumulate shaft 203. When the total cycle is under-way, the various circuit breakers, including those actuated by the cams 256, will cause the proper timing and inter-action in the electrical circuits, as described above.

It is to be pointed out that the structure of the one-revolution clutches 199 and 202 is conventional. Also, the structure of each is the same, so that a description of one will suffice for both. Referring to Fig. 11, it is pointed out that the input gear 198 is continuously driven and carries with it a square-notched wheel 279. Adjacent to the wheel 279 is a dog 280 which is pivotally carried on an output rotation yoke 281. The yoke 281 is fastened securely to the shaft 203 for causing rotation thereof. The dog 280 has an arm 282 which extends into the path of a control and release latch 283. The action of this latch will be clear when it is pointed out that there is a pivoted catch 284 for holding the arm 282 in the notch near the extremity of the latch 283. And the latch 283 is pivoted about a screw 285, between the position illustrated (against a stop 286) and one for releasing the arm 282. When the arm 282 is released, the dog 280 will drop into the next notch of the wheel 279 (aided by a spring bias if necessary) and so cause the yoke 281 to rotate with the wheel 279 for a full revolution until the arm 282 strikes the catch 284 and enters the latch 283 as the dog 280 is lifted out of the notch in wheel 279.

It will be observed that whereas there has been described a counter employing magnetic cores for storing bits of information, the principles of operation of a counter system according to this invention are equally applicable to one employing some other type of storage device. In other words, it is contemplated that the operation of a counter according to this invention would be the same in principle with any bi-state storage element employed, in place of the magnetic cores illustrated. Furthermore, while there has been disclosed in considerable detail a particular embodiment of the invention, this is not to be taken as in any way limiting the invention but merely as being descriptive thereof.

It is claimed:

1. A memory type counter system employing bi-state memory elements, one state being representative of the presence of information while the other state represents the absence thereof, and including a storage matrix circuit having a plurality of rows and columns of said memory elements, two summation matrices each having rows and columns of bi-state memory elements, and a temporary storage group of bi-state memory elements, said storage matrix having a plurality of rows representing digit orders of arabic numbers and a plurality of columns representing binary code values for each digit as well as two bi-state elements connected to all of said rows in common, said system comprising first circuit means for reading out pulses representing information from some of said columns into said temporary storage group, second circuit means for reading out pulses representing information from other of said columns simultaneously with information from said two bi-state elements into one of said summation matrices, third circuit means for reading out pulses representing information from said temporary storage group and from said one summation matrix simultaneously into said other summation matrix, said first and third circuit means including means for switching said circuits to direct said pulses into predetermined rows and columns of said summation matrices in order to cause the memory elements in one of said summation matrices to be set in the information state along predetermined lines of an output dimension of said last named summation matrix representative of a decimal digit so that there is introduced into said other summation matrix an encoded arabic digit to be added algebraically to the information read out of said storage matrix, and fourth circuit means for reading out the information from said other summation matrix along said output dimension to be utilized as desired.

2. A memory type counter system employing bi-state memory elements, one state being representative of the presence of information while the other state represents the absence thereof, and including a storage matrix circuit having a plurality of rows and columns of said memory elements, two summation matrices each having rows and columns of bi-state memory elements, and a temporary storage group of bi-state memory elements, said storage matrix having a plurality of rows representing digit orders of arabic numbers, a quinary group of columns representing the even arabic digits and a binary pair of columns to provide the odd arabic digits as well as two bi-state elements connected to all said rows in common, said system comprising first circuit means for reading out pulses representing information from said quinary group of columns into said temporary storage group of elements, second circuit means for reading out pulses representing information from said binary pair of columns simultaneously with pulses representing information from said two bi-state elements into one of said summation matrices, third circuit means for reading out pulses representing information from said temporary storage group and from said one summation matrix simultaneously into said other summation matrix, said first and third circuit means including means for switching said circuits to direct said pulses into predetermined rows and columns of said summation matrices in order to cause the memory elements in one of said summation matrices to be set in the information state along predetermined lines of an output dimension of said last named summation matrix representative of a decimal digit so that there is introduced into said other summation matrix an encoded arabic digit to be added algebraically to the information read out of said storage matrix, and fourth circuit means for reading out the information from said other summation matrix along said output dimension to be utilized as desired.

3. A memory type counter system employing bi-state memory elements, one state being representative of the presence of information while the other state represents the absence thereof, and including a storage matrix circuit having a plurality of rows and columns of said memory elements, two summation matrices each having rows and columns of bi-state memory elements, and a temporary storage group of bi-state memory elements, said storage matrix having a plurality of rows representing digit orders of arabic numbers, a quinary group of columns representing the even arabic digits and a binary pair of columns to provide the odd arabic digits as well as two bi-state elements connected to all of said rows in common, selective circuit switching means for introducing a read pulse to a given row of said memory elements so that elements in a state representing the presence of information will switch and produce a read out signal, said system comprising first circuit means for reading out signals representing information from said quinary group of columns into said temporary storage group of elements, second circuit means for reading out signals representing information from said binary pair of columns simultaneously with signals representing information from said two bi-state elements into one of said summation matrices, third circuit means for reading out signals representing information from said temporary storage group and from said one summation matrix simultaneously into said other summation matrix, said first and third circuit means including means for switching said circuits to direct said signals into predetermined rows and columns of said summation matrices in order to cause the memory elements in one of said summation matrices to be set in the information state along predetermined lines of an output dimension of said last named summation matrix representative of a decimal digit so that there is introduced into said other summation matrix an encoded arabic digit to be added algebraically to the information read out of said storage matrix, and fourth circuit means for reading out signals representing the information from said other summation matrix into write pulse producing means for given ones of the columns of said storage matrix, said write pulses acting to reset certain of said elements in the said given row in accordance with the summation of the pre-existing arabic numeral order digit in the storage matrix and the encoded arabic digit, in order to re-enter said sum into said storage matrix.

4. The invention in ccordance with claim 1, wherein said bi-state memory elements are electromagnetic cores.

5. The invention in accordance with claim 2 wherein said bi-state memory elements are electromagnetic cores.

6. The invention in accordance with claim 3 wherein said bi-state memory elements are electromagnetic cores.

7. A memory type counter system for use with electric typewriters and the like, said system employing closed path magnetic material ring shaped cores constructed of a material having a substantially rectangular hysteressis loop and including a storage matrix circuit having a plurality of rows and columns of said cores, two summation matrices each having rows and columns of said cores, and a temporary storage group of said cores, said storage matrix having a plurality of rows representing orders of arabic numbers, a quinary group of columns representing the even arabic digits and a binary pair of columns to provide the odd arabic digits, as well as two cores connected to all of said rows in common for providing decimal carry information, selective circuit switching means for introducing a read pulse to a given row of said memory cores so that cores in a predetermined state will switch and produce a read out signal, said system comprising first circuit means for reading out signals representing information from said quinary group of columns into said temporary storage group of cores, second circuit means for reading out signals representing information from said binary pair of columns simultaneously with signals representing information from said two decimal carry cores into one of said summation matrices, third circuit means for reading out signals representing information from said temporary storage group and from said one summation martix simultaneously into said other summation matrix, said first and third circuit means including means for switching said circuits to direct said signals into predetermined rows and columns of said summation matrices in order to cause the memory elements in one of said summation matrices to be set in the information state along predetermined lines of an output dimension of said last named summation matrix representative of a decimal digit so that there is introduced into said other summation matrix an encoded arabic digit to be added algebraically to the information read out of said storage matrix, and fourth circuit means for reading out signals representing the information from said other summation matrix into write pulse producing means for given ones of the columns of said storage matrix, said write pulses acting to reset certain of said cores in the given row in accordance with the summation of the pre-existing arabic numeral order digit in the storage matrix and the encoded arabic digit, in order to re-enter said sum into said storage matrix.

8. A memory type counter system employing bi-state memory elements of which one state represents the presence of information and the other state represents the absence thereof comprising a storage matrix having a plurality of rows and columns of said memory elements, a first and a second summation matrix each having rows and columns of said bi-state memory elements, a temporary storage group of said bi-state memory elements, first circuit means for reading out pulses representative of information stored in said storage matrix into said temporary storage group and into said first summation matrix, second circuit means for reading out pulses representative of information in said temporary storage group and in said first summation matrix simultaneously and entering the same into said second summation matrix, a key set digit entry network connected between said first and second summation matrices adapted to direct pulses from said first summation matrix into predetermined columns of said second summation matrix in response to the setting of said network whereby the memory elements in said second summation matrix are set in the information state along predetermined lines of an output dimension thereof representative of the sum of the digits introduced thereto, and third circuit means for reading out pulses representative of the information from said output dimension of said second summation matrix.

9. The invention according to claim 8, wherein said bi-state memory elements are electro-magnetic cores.

References Cited in the file of this patent

UNITED STATES PATENTS

| | | |
|---|---|---|
| 2,512,860 | Henrich | June 27, 1950 |
| 2,626,752 | Williams | Jan. 27, 1953 |
| 2,636,672 | Hamilton et al. | Apr. 28, 1953 |
| 2,691,154 | Rajchman | Oct. 5, 1954 |
| 2,691,155 | Rosenberg et al. | Oct. 5, 1954 |
| 2,691,156 | Salte et al. | Oct. 5, 1954 |
| 2,691,157 | Stuart-Williams et al. | Oct. 5, 1954 |
| 2,697,178 | Isborn | Oct. 14, 1954 |
| 2,720,597 | Stuart-Williams et al. | Oct. 11, 1955 |
| 2,734,183 | Rajchman | Feb. 7, 1956 |
| 2,734,187 | Rajchman | Feb. 7, 1956 |
| 2,735,021 | Nilssen | Feb. 14, 1956 |
| 2,750,580 | Rabenda et al. | June 12, 1956 |
| 2,798,156 | Selmer | July 2, 1957 |

UNITED STATES PATENT OFFICE

CERTIFICATE OF CORRECTION

Patent No. 2,932,451 April 12, 1960

Horace S. Beattie et al.

It is hereby certified that error appears in the printed specification of the above numbered patent requiring correction and that the said Letters Patent should read as corrected below.

Column 10, line 73, for "Byt" read -- By --; column 11, line 17, for "which" read -- while --; column 15, line 34, for "latch" read -- latching --; column 20, line 30, for "numeral" read -- numerical --; line 43, for "hysteressis" read -- hysteresis --.

Signed and sealed this 27th day of September 1960.

(SEAL)

Attest:

KARL H. AXLINE
Attesting Officer

ROBERT C. WATSON
Commissioner of Patents